United States Patent [19]

Cassat

[11] 4,013,600
[45] Mar. 22, 1977

[54] AQUEOUS COMPOSITIONS OF POLYIMIDES CONTAINING HETERO-POLYSACCHARIDE

[75] Inventor: Robert Cassat, Saint-Fons, France

[73] Assignee: Rhone-Poulenc Industries, Paris, France

[22] Filed: May 16, 1975

[21] Appl. No.: 578,025

[30] Foreign Application Priority Data

May 20, 1974 France .............................. 74.17451

[52] U.S. Cl. ........................... 260/17.4 ST; 260/9; 427/385 R
[51] Int. Cl.$^2$ ......................................... C08L 5/00
[58] Field of Search ...................... 260/17.4 ST, 9; 427/385

[56] References Cited

UNITED STATES PATENTS

| | | | |
|---|---|---|---|
| 3,018,290 | 1/1962 | Sayers et al. | 260/326.3 |
| 3,349,077 | 10/1967 | Schweiger | 260/209 |
| 3,447,940 | 6/1969 | Halleck | 260/17.4 |
| 3,562,787 | 2/1971 | Naselow | 260/30.2 |
| 3,717,615 | 2/1973 | Holub et al. | 260/78 UA |
| 3,894,976 | 7/1975 | Kang et al. | 260/17.4 |

OTHER PUBLICATIONS

Chem. Absts., 67:33936w, "Wire Coating", E. I. du Pont.

*Primary Examiner*—Edward Woodbury
*Attorney, Agent, or Firm*—Stevens, Davis, Miller & Mosher

[57] ABSTRACT

Pseudoplastic aqueous suspensions are provided having good storage stability. These suspensions are of a prepolymer powder prepared from A. A imide group-containing compound chosen from the group consisting of:
  a. a bis-imide of the formula:

$$\text{D}\begin{array}{c}\text{CO}\\ \diagdown\\ \text{CO}\end{array}\text{N}-\text{A}-\text{N}\begin{array}{c}\text{CO}\\ \diagup\\ \text{CO}\end{array}\text{D} \quad (I)$$

in which D represents a divalent radical which has the formula:

wherein Y represents H, CH$_3$ or Cl and $m$ is equal to 0 or 1, and A represents a divalent organic radical containing 2 to 30 carbon atoms, and
  b. a mixture of a bis-imide of formula (I) and a mono-imide of the formula:

$$\text{D}\begin{array}{c}\text{CO}\\ \diagdown\\ \text{CO}\end{array}\text{N}-\text{R} \quad (II)$$

in which D is as defined above and R represents a hydrogen atom or a monovalent organic radical containing 1 to 20 carbon atoms, and B. an amino compound chosen from the group consisting of:
  a. one or more polyamines containing 2 to 5 primary or secondary amino groups, at least one of these groups being primary,
  b. a mixture comprising one or more polyamines as defined under a) and one or more primary and/or secondary monoamines and/or one or more secondary polyamines, and
  c. a polyamine of the general formula:

in which x represents a number from 0.1 to 2 and R' represents a divalent hydrocarbon radical with 1 to 8 carbon atoms, the suspension also comprising, based on the weight of the powder, 0.01 to 8% by weight of a heteropolysaccharide of very high molecular weight.

7 Claims, 1 Drawing Figure

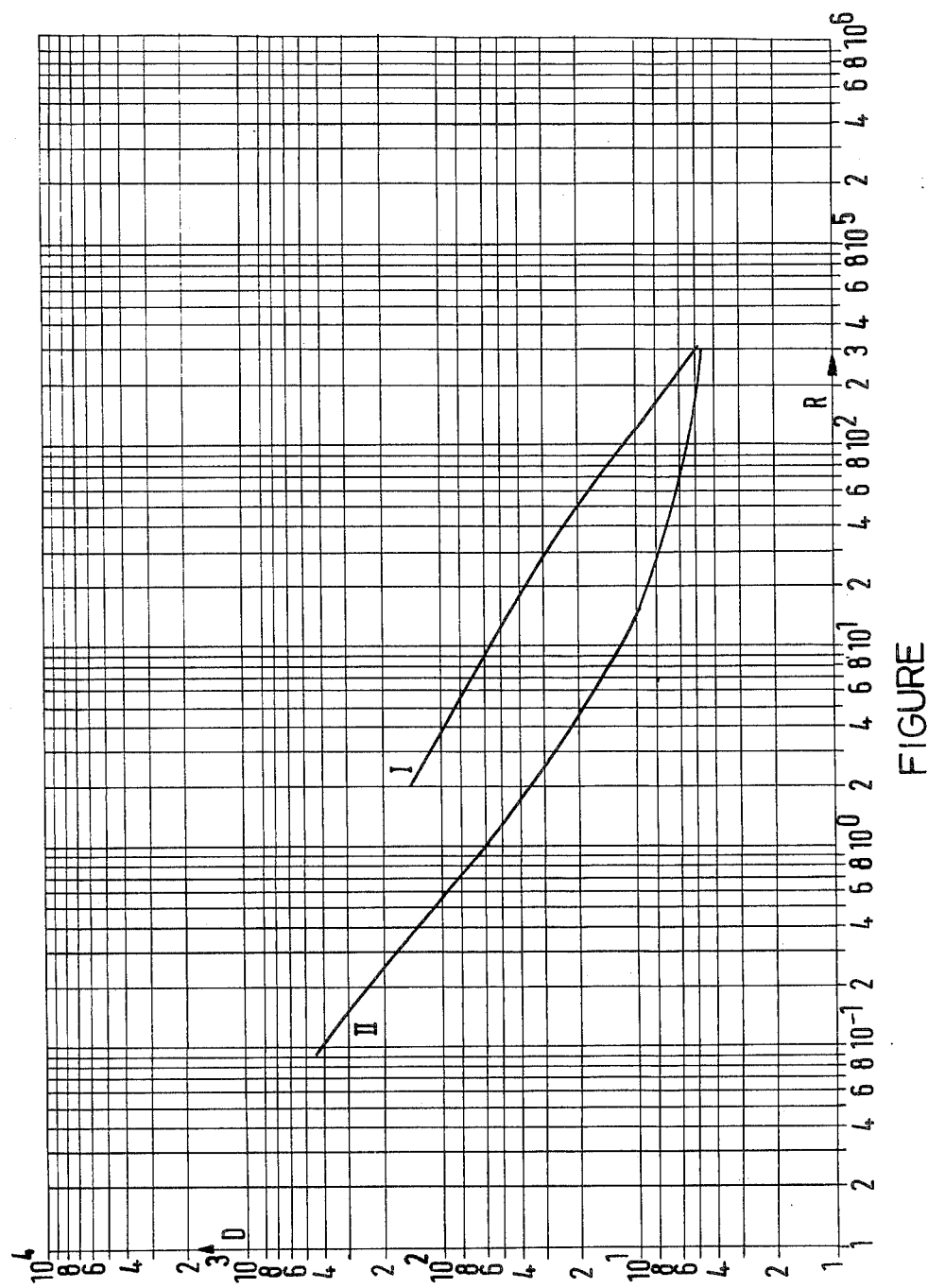
FIGURE

AQUEOUS COMPOSITIONS OF POLYIMIDES CONTAINING HETERO-POLYSACCHARIDE

The present invention relates to pseudoplastic aqueous suspensions of prepolymers derived from bis-imides.

Thixotropic suspensions comprising an imide group containing prepolymer, in the dispersed solid state, and water have been described in the French Patent Application No. 70/38,362.

In order to prepare preimpregnated intermediate articles which can be cured to form heat-resistant composite articles, it is necessary to have available aqueous suspensions based on stable prepolymers possessing imide groups, the rheological properties of which are suited to the method of processing.

According to the present invention there are provided pseudoplastic aqueous suspensions of a prepolymer powder prepared from:

A. a compound possessing an imide group, chosen from the group consisting of
  a. a bis-imide of the formula:

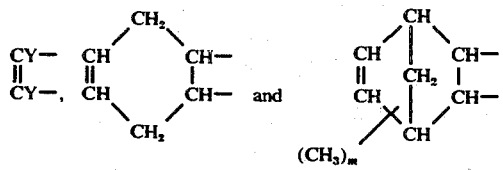   (I)

in which the symbol D represents a divalent radical chosen from the group consisting of radicals of the formula:

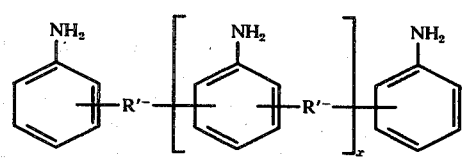

wherein Y represents H, $CH_3$ of Cl and m is equal to 0 or 1, and the symbol A represents a divalent organic radical containing 2 to 30 carbon atoms, and
  b. a mixture comprising a bis-imide of formula (I) and a mono-imide of the formula

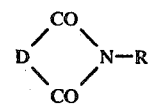   (II)

in which the symbol D is as defined above and the symbol R represents a hydrogen atom or a monovalent organic radical containing 1 to 20 carbon atoms, and B. an amine-type compound chosen from the group consisting of:
  a. one or more polyamines containing 2 to 5 primary or secondary amino groups, at least one of these groups being primary,
  b. a mixture comprising one or more polyamines as defined under a) and one or more primary and/or secondary monoamines and/or one or more secondary polyamines, and
  c. a polyamine of the average general formula:

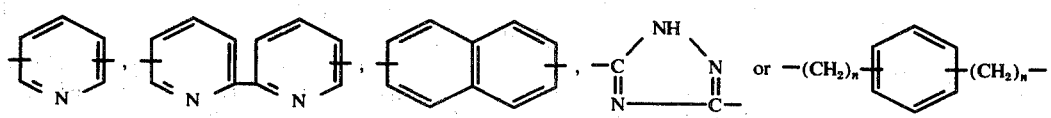   (III)

in which x represents a number ranging approximately from 0.1 to 2 and R' represents a divalent hydrocarbon radical with 1 to 8 carbon atoms, the suspension also comprising, based on the weight of the powder, 0.01 to 8% by weight of a heteropolysaccharide of very high molecular weight.

"Pseudoplastic suspension", as used herein, means a suspension, the apparent viscosity of which decreases when the rate of shear increases: they become fluid on shearing but immediately become more viscous when the shear stress is removed or reduced.

In formula (I), the symbol A can represent, for example, a linear alkylene radical with less than 13 carbon atoms, a phenylene radical, a cyclohexylene radical, a

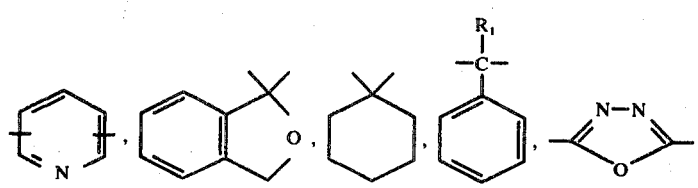

radical wherein n represents an integer from 1 to 3. The symbol A can also comprise several alkylene radicals bonded to one another via an inert atom or group such as —O— and —$NR_1$—, or several phenylene or cyclohexylene radicals bonded to one another via a single valency bond or via an inert atom or group such as —O—, —S—, an alkylene group with 1 to 3 carbon atoms, —CO—, —$SO_2$—, —$NR_1$—, —N=N—, —CONH—, —COO—, —P(O)$R_1$—, —CONH—X—NHCO—,

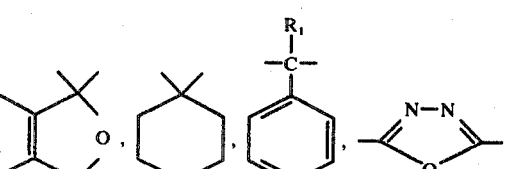

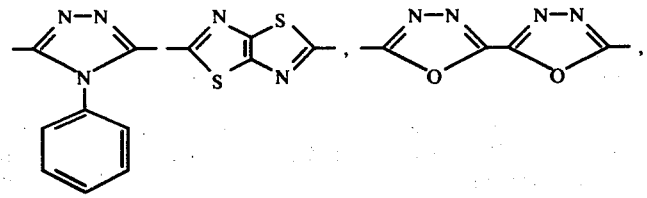

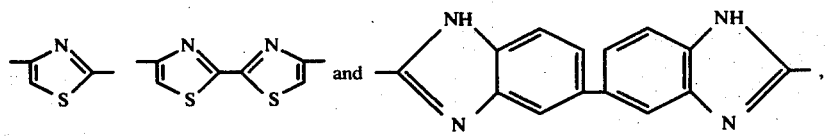

wherein $R_1$ represents a hydrogen atom, an alkyl radical with 1 to 4 carbon atoms, a phenyl radical or a cyclohexyl radical, and X represents an alkylene radical with less than 13 carbon atoms. The various phenylene or cyclohexylene radicals can be substituted by groups such as $CH_3$ and $OCH_3$ or by a chlorine atom.

Specific examples of bis-imides which may be used include N,N'-ethylene-bis-maleimide, N,N'-hexamethylenebis-maleimide, N,N'-meta-phenylene-bis-maleimide, N,N'-para-phenylene-bis-maleimide, N,N'-4,4'-biphenylylene-bis-maleimide, N,N'-4,4'-diphenylmethane-bis-maleimide, N,N'-4,4'-diphenylmethane-bis-tetrahydrophthalimide, N,N'-4,4'-(diphenyl ether)-bis-maleimide, N,N'-4,4'-(diphenyl sulphide)-bis-maleimide, N,N'-4,4'-diphenylsulphone-bis-maleimide, N,N'-4,4'-dicyclohexylmethane-bis-maleimide, N,N'-α,α'-4,4'-dimethylenecyclohexane-bis-maleimide, N,N'-metaxylylene-bis-maleimide, N,N'-para-xylylene-bis-maleimide, N,N'-4,4'-(1,1-diphenyl-cyclohexane)-bis-maleimide, N,N'-4,4'-diphenylmethane-bis-citraconimide, N,N'-4,4'-(diphenyl ether)-bis-endomethylenetetrahydrophthalimide, N,N'-4,4'-diphenylmethane-bis-chloromaleimide, N,N'-4,4'-(1,1-diphenylpropane)-bis-maleimide, N,N'-4,4'-(1,1,1-triphenyl-ethane)-bis-maleimide, N,N'-4,4'-triphenylmethane-bis-maleimide, N,N'-3,5-(1,2,4-triazole)-bis-maleimide, N,N'-dodecamethylene-bis-maleimide, N,N'-(2,2,4-trimethyl-hexamethylene)-bis-maleimide, 1,2-bis-(2-maleimido-ethoxy)-ethane, 1,3-bis-(3-maleimido-propoxy)-propane, N,N'-4,4'-benzophenone-bis-maleimide, N,N'-pyridine-2,6-diyl-bis-maleimide, N,N'-1,5-naphthylene-bis-maleimide, N,N'-1,4-cyclohexylene-bis-maleimide, N,N'-1,3-(5-methyl-phenylene)-bis-maleimide and N,N'-1,3-(5-methoxy-phenylene)-bis-maleimide.

These bis-imides can be prepared by applying the methods described in, for example, United States Patent No. 3,018,290 and British Patent Specification No. 1,137,592.

In formula (II), the symbol R can, for example, represent a linear or branched alkyl or alkenyl radical which can contain up to 20 carbon atoms, a cycloalkyl radical containing 5 or 6 ring carbon atoms, a mono- or bicyclic aryl radical, an alkylaryl radical or an aralkyl radical containing up to 20 carbon atoms, one of the radicals

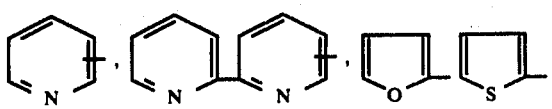

or a monovalent radical consisting of a phenyl radical and a phenylene radical bonded to one another via a single valency bond or via an inert atom or group such as —O—, —S—, an alkylene radical with 1 to 3 carbon atoms, —CO—, —$SO_2$—, —$NR_1$—, —N=N—, —CONH— and —COO—, wherein $R_1$ has the meaning given above. Moreover, these various radicals can be substituted by one or more atoms, radicals, or groups such as F, Cl, $CH_3$, $OCH_3$, $OC_2H_5$, OH, $NO_2$, —COOH, —$NHCOCH_3$ and

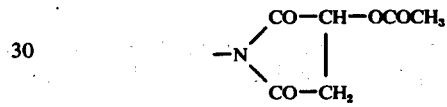

Specific examples of mono-imides of formula (II) which may be used include maleimide, N-phenyl-maleimide, N-phenylmethylmaleimide, N-phenyl-chloromaleimide, N-p-chlorophenylmaleimide, N-p-methoxyphenylmaleimide, N-p-methylphenylmaleimide, N-p-nitrophenylmaleimide, N-p-phenoxyphenylmaleimide, N-p-phenylaminophenylmaleimide, N-p-phenoxycarbonylphenylmaleimide, N-p-phenylcarbonylphenylmaleimide, 1-maleimido-4-acetoxysuccinimidobenzene, 4-maleimido-4'-acetoxysuccinimido-diphenylmethane, 4-maleimido-4'-acetoxysuccinimido-diphenyl ether, 4-maleimido-4'-acetamido-diphenyl ether, 2-maleimido-6-acetamido-pyridine, 4-maleimido-4'-acetamido-diphenylmethane, N-methylmaleimide, N-ethylmaleimide, N-vinylmaleimide, N-allylmaleimide, N-cyclohexylmaleimide and N-decylmaleimide. These mono-imides can be prepared by applying the methods described in, for example, U.S. Pat. Nos. 2,444,536 and 3,717,615 and German Patent Application (DOS) 2,354,654.

When a mixture comprising both a bis-imide of formula (I) and a mono-imide of formula (II) is used, the number of imide groups supplied by the mono-imide suitably represents up to 30% of the total number of imide groups supplied by the mixture.

The amine-type compound (B) can be, in particular, a polyamine (1) of the formula:

$$H_2N - E - NH_2$$

(IV)

in which the symbol E can represent one of the radicals defind under A in formula (I). Examples of such compounds containing two primary amino groups include

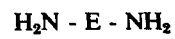

bis-(4-amino-cyclohexyl)-methane, 2,2-bis-(4-aminocyclohexyl)-propane, 1,4-diamino-cyclohexane, 2,6-diamino-pyridine, meta-phenylenediamine, para-phenylenediamine, bis-(4-amino-phenyl)-methane, 2,2-bis-(4-amino-phenyl)-propane, benzidine, 4,4'-diamino-phenyl ether, 4,4'-diamino-phenyl sulphide, 4,4'-diaminodiphenylsulphone, bis-(4-amino-phenyl)-methyl-phosphine oxide, bis-(4-amino-phenyl)-phenyl-phosphine oxide, N,N'-bis(4-amino-phenyl)-methylamine, 1,5-diaminonaphthalene, meta-xylylene-diamine, para-xylylene-diamine, 1,1-bis-(para-amino-phenyl)-phthalane, α, ω-polymethylene-diamines such as hexamethylene-diamine, octamethylene-diamine, decamethylene-diamine and 2,5-dimethyl-heptamethylene-diamine, polyether diamines of the formula $H_2N(CH_2)_tO(CH_2CH_2O)_uNH_2$ in which $t$ and $u$ are integers from 1 to 10, such as the diamine of the formula: $H_2N(CH_2)_3O(CH_2)_2O(CH_2)_3NH_2$, bis-hexamethylene-triamine, diethylene-triamine, tetraethylene-pentamine, 7,8-diamino-p-methane, 6,6'-diamino-2,2'-dipyridyl, 4,4'-diamino-benzophenone, 4,4'-diamino-azobenzene, bis-(4-amino-phenyl)-phenylmethane, 1,1-bis-(4-amino-phenyl)-cyclohexane, 1,1-bis-(4-amino-3-methyl-phenyl)-cyclohexane, 2,5-bis-(m-aminophenyl)-1,3,4-oxadiazole, 2,5-bis-(p-amino-phenyl)-1,3,4-oxadiazole, 2,5-bis-(m-aminophenyl)-thiazolo(4,5-d)-thiazole, 5,5'-di-(m-aminophenyl)-2,2'-bis-(1,3,4-oxadiazolyl), 4,4'-bis-(p-aminophenyl)-2,2'-dithiazole, m-bis-(4--p-aminophenylthiazol-2-yl)-benzene, 2,2'-bis-(m-aminophenyl)-5,5'-dibenzimidazole, 4,4'-diamino-benzanilide, phenyl 4,4'-diaminobenzoate, N,N'-bis-(4-amino-benzoyl)-p-phenylene-diamine, 3,5-bis-(m-aminophenyl)-4-phenyl-1,2,4-triazole, N,N'-bis-(p-amino-benzoyl)-4,4'-diamino-diphenylmethane, bis-p-(4-amino-phenoxycarbonyl)-benzene, bis-p-(4-aminophenoxy)-benzene, 3,5-diamino-1,2,4-triazole, 1,1-bis-(4-aminophenyl)-1-phenyl-ethane and 3,5-bis-(4-amino-phenyl)-pyridine.

The amine-type compound can also be a polyamine (2) which contains 3 to 5 —NH₂ groups per molecule and contains up to 50 carbon atoms. In these polyamines (2), the —NH₂ groups can be carried by a benzene nucleus optionally substituted by methyl groups, or by a naphthalene, pyridine or triazine nucleus; they can also be carried by several benzene nuclei bonded to one another via single valency bond or via an inert atom or group which can be one of those described above under A, or

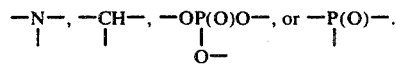

As examples of such polyamines, there may be mentioned 1,2,4-triamino-benzene, 1,3,5-triamino-benzene, 2,4,6-triamino-toluene, 2,4,6-triamino-1,3,5-trimethyl-benzene, 1,3,7-triamino-naphthalene, 2,4,6-triamino-pyridine, 2,4,4'-triamino-diphenyl, 2,4,4'-triamino-phenyl ether, 2,4,4'-triamino-diphenylmethane, 2,4,4'-triamino-diphenylsulphone, 2,4,4'-triamino-benzophenone, 2,4,4'-triamino-3-methyl-diphenylmethane, N,N,N-tris-(4-amino-phenyl)-amine, tris-(4-amino-phenyl)-methane, 4,4',4"-triamino-phenyl ortho-phosphate, tris-(4-amino-phenyl)-phosphine oxide, 3,5,4'-triamino-benzanilide, melamine, 3,5,3',5'-tetraamino-benzophenone, 1,2,4,5-tetraamino-benzene, 2,3,6,7-tetraamino-naphthalene, 3,3'-diamino-benzidine, 3,3',4,4'-tetraaminophenyl ether, 3,3',4,4'-tetraamino-diphenylmethane, 3,3',4,4'-tetraamino-diphenylsulphone, 3,5-bis-(3,4'-diamino-phenyl)-pyridine and oligomers of the average formula:

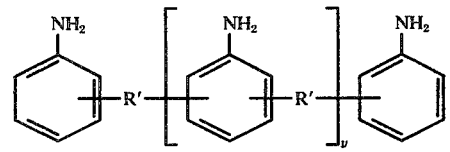

wherein $y$ represents a number ranging approximately from 0.1 to 2, the symbol R' denoting a divalent hydrocarbon radical which has 1 to 8 carbon atoms and which is derived from an aldehyde or a ketone of the general formula:

$$O = R'$$

in which the oxygen atom is bonded to a carbon atom of the radical R'; typical such aldehydes and ketones are formaldehyde, acetaldehyde, oenanthaldehyde, benzaldehyde, acetone, methyl ethyl ketone, 2-hexanone, cyclohexanone and acetophenone. These oligomers possessing amino groups can be prepared in accordance with known processes such as those described in French Patents Nos. 1,430,977, 1,481,935 and 1,533,696; the crude mixtures of polyamines obtained in accordance with these processes can be enriched in one or more constituents, for example by distillation under reduced pressure.

The amine-type compound can also be a polyamine (3) which contains up to 50 carbon atoms and comprises a primary amine group and one or more secondary amine groups. As examples of such polyamines (3), there may be mentioned especially (4-methylamino-phenyl)-(4'-aminophenyl)-methane, 4-methylamino-phenyl 4'-amino-phenyl ether, (4-methylamino-phenyl)-(4'-amino-phenyl)-sulphone, 1-methylamino-4-aminobenzene, 2-methylamino-4-amino-toluene, 2-methylamino-5-amino-anisole, 3-methylamino-propylamine, N-(4-aminobenzoyl)-methylamine, 2-ethoxy-4-methylamino-aniline, 3'-methylamino-4-benzoylamino-aniline, 3-ethylaminoethoxy-propylamine, 3-ethylaminoethylmercapto-propylamine, 6-methylamino-hexylamine, (4-methylamino-cyclohexyl)-(4'amino-cyclohexyl)-methane, 2-phenylamino-ethylamine, 2-α-pyridyl-amino-ethylamine, 2-p-methylaminophenyl-5-amino-1,3,4-oxadiazole, 2-m-methylaminophenyl-5-amino-benzoxazole, N-(p-aminobenzoyl)-piperazine, 3,5-bis-(methylamino)-4'-amino-benzanilide and 2,4-bis-(methylamino)phenyl 4'-aminophenyl ether.

It is to be understood that it is possible to use one or more amine-type compounds belonging to one or other of the types of polyamines (1), (2) and (3) mentioned above, or to use a mixture of compounds belonging to two or three of these types.

It is also possible to use a mixture comprising one or more polyamines (1), (2) and/or (3) and one or more other amine-type compounds comprising only one primary or secondary amino group or comprising several amino groups, none of which is primary.

Examples of suitable primary or secondary monoamines are methylamine, ethylamine, butylamine, octylamine, cyclohexylamine, cyclohexylmethylamine, aniline, o-chloroaniline, p-anisidine, α-naphthylamine, benzylamine, 2-phenyl-ethylamine, 2-amino-pyridine, 3-amino-furane, 2-amino-pyrimidine, 5-amino-benzoxazole, 5-amino-benzothiazole, ethanolamine, hexylamine, nonylamine, laurylamine, stearylamine, 3-butoxy-propylamine, 3-diethylaminopropylamine, o-toluidine, o-anisidine, o-aminophenol, phenyl p-aminophenyl ether, m-amino-benzophenone, m-aminobenzanilide, p-diphenylamino-aniline, dibutylamine, diethanolamine, methylethylamine, monoethylaniline, piperidine, morpholine, monoethylamino-cyclohexane, monomethylaminonaphthalene, diphenyl- and N-α or β-naphthyl-anilines, and (phenyl)-(4-amino-phenyl)-sulphone.

When the amine-type compound comprises a monoamine or a secondary polyamine, the proportion of the latter in the mixture is preferably such that the number of amino groups supplied by the said amine represents at most 30% of the total number of amino groups of the amine-type compound (B).

By way of illustration of secondary polyamines, which can also possess tertiary amine groups, there may be mentioned bis-(4-methylamino-phenyl)-methane, bis-(4-methylamino-phenyl) ether, 2,2-bis-(4-methylamino-phenyl)propane, bis-(3-methylamino-phenyl)-sulphone, 1,3-bis(methylamino)-benzene, 1,4-bis-(phenylamino)-benzene, 1,4-bis-(β-naphthylamino)-benzene, bis-(4-methylaminocyclohexyl)-methane, N,N'-diethylhexamethylenediamine, 2,5-bis-(methylamino)-1,3,4-oxadiazole, piperazine, 1,2-bis-(3-methylamino-propoxy)-ethane, N-(4-methylamino-phenyl)piperazine, tris-(4-methylamino-phenyl)-amine, tris-(4-ethylamino-phenyl)-phosphine, 3,5,4'-tris-(methylamino)-benzanilide and 3,3',5,5'-tetrakis-(methylamino)benzophenone.

In formula (III), R' represents a divalent hydrocarbon radical which has 1 to 8 carbon atoms and which is derived from an aldehyde or a ketone of the general formula:

$$O = R'$$

in which the oxygen atom is bonded to a carbon atom of the radical R, the number of imide groups supplied by the bis-imide being 1.1 to 50 per -NH₂ groups supplied by the polyamine.

Amounts of the compound possessing imide groups (A) and of the amine-type compound (B) such that the ratio

number of double bonds of the compound A
number of —NH₂ groups of the compound B is from 0.8 to 10, are advantageously used. This ratio is preferably from 1 to 5.

The prepolymers can be prepared in bulk, triggering the reaction by heating the mixture of reagents. The triggering temperature can vary within rather wide limits depending on the nature of the reagents present, but as a general rule, it is from 100° to 250° C, most frequently from 110° to 180° C. Depending on the physical state of the reagents present, it is possible to use conventional techniques for mixing finely divided solids or to dissolve or disperse one of the reagents in the other which is kept in the liquid state.

Depending on the temperature, the nature and the proportions of the reagents present and depending on the extent to which it is desired that the reaction shall take place, the duration of heating can vary within rather wide limits; but is generally from 5 minutes to 3 hours.

The prepolymers can also be prepared by heating the reagents in an inert polar diluent which is liquid at the temperature used (usually 100° to 250° C, and preferably 110° to 200° C). Amongst the diluents which can be used, there may be mentioned especially polar solvents such as dimethylformamide, N-methylpyrrolidone, dimethylacetamide, N-methylcaprolactam, diethylformamide, N-acetylpyrrolidone and cresols. The amounts of diluent generally represent 0.2 to 20 times the weight of imide introduced.

Regardless of the method of preparation, the prepolymer obtained is then reduced to a powder, the particle size of which is usually less than 100 microns but can be as much as, for example, 250 microns.

The compositions of this invention are characterised by the presence of a heteropolysaccharide of very high molecular weight. Such products have been described in U.S. Pat. No. 3,349,077 and Canadian Patents Nos. 681,525 and 746,000 the disclosure of which is hereby incorporated by reference. These products are stable to heat and to electrolytes. They are soluble in or compatible with a large number of solvents, in particular polar solvents. They result from the fermentation of carbohydrates by, for example, bacteria of the Xanthomonas or Arthrobacter genus or yeasts of the Cryptococcus genus. They have a molecular weight of the order of one million or more, for example several millions, each molecule comprising mainly the following compounds: glucose, mannose and glucuronic acid in the form of sodium and potassium salts.

The solutions of these products are pseudoplastic and a low concentration of the polysaccharide, for example 0.01% relative to the powder, is sufficient to cause appreciable thickening which manifests itself in good stability of the suspension. Furthermore, it is in general possible to use amounts of polysaccharides of the order of 3%, and even up to 8%, without having a detrimental effect on the rheological properties of the suspensions, and without affecting the properties of the coating obtained. The proportion of polysaccharide to be employed naturally depends on the solids content of the suspension and on the rheological properties desired.

The polysaccharide can be incorporated into the composition by any suitable procedure. It is usually dissolved in a small amount of water which is diluted thereafter.

The medium for suspending the prepolymer powder can optionally contain an organic solvent. Amongst the organic solvents which can be present in the compositions preference is given to those with a boiling point which does not deviate markedly from the range 120°–250° C, for example 110° to 270° C, and which are solvents for the prepolymer within at least part of the temperature range from 25° to 150° C. Amongst the solvents which can be used, there may be mentioned 2-methoxy-ethanol, 2-ethoxy-ethanol and their acetates, N-methylpyrrolidone, dimethylformamide, dimethylacetamide, N-methylcaprolactam, N-acetylpyrrolidone and diethylformamide. It is particularly advantageous to use N-methylpyrrolidone.

In the compositions of this invention, the prepolymer can generally represent, by weight, from 5 to 60% of the weight of the composition. When an organic solvent is present, it preferably represents up to 15%, especially from 5% to 15%, by weight of the weight of the liquid phase.

The preparation of the compositions is generally carried out at ambient temperature (20° to 30° C.). It consists of dispersing the prepolymer in the liquid medium formed by the water in which the heteropolysaccharide is dissolved, optionally in combination with the organic solvent. The prepolymer can be dispersed in the liquid phase by applying the stirring methods in use in the technique of suspending solid particles in liquids. When the suspensions comprise an organic solvent, the latter can be introduced initially, in the form of a solution in water; it is also possible to prepare the suspension of prepolymer in water beforehand and then to add the organic solvent at the end of the operation or at the time of using the composition.

The compositions according to the invention can be used directly after their preparation but, since they possess noteworthy stability on storage, they can be stored conveniently with a view to being used subsequently. They are preferably stored in closed containers at temperatures below 30° C., and above their freezing point.

The compositions of the present invention can be used to prepare composite materials; they are particularly valuable for the manufacture of coverings and preimpregnated intermediate articles, the reinforcement of which consists of fibrous materials. These fibrous materials can be based on, for example, aluminium or zirconium silicate or oxide, carbon, graphite, boron, asbestos or glass. Mica flakes can also be suitable. In the case of glass, strands, yarns, tows or fabrics such as satin or taffetas, formed from continuous fibres, can be used; yarns or woven or non-woven fabrics originating from combining discontinuous fibres can also be used. The fibrous material can be impregnated by applying customary techniques such as immersion, transfer impregnation, impregnation using a knife or a casting device, or by spraying; it is advantageous to moisten the fibres beforehand, using water optionally in combination with an organic solvent. With the compositions which contain an organic solvent, impregnation can be carried out rapidly without losing its efficiency.

The fibrous material coated with the composition is then dried, preferably in a ventilated atmosphere; the temperature and the duration of the drying process can vary depending on whether the composition does or does not contain an organic solvent and, if a solvent is present, depending on the volatility of the solvent. As a general rule, drying is effected at 100° to 200° C., for 1 hour to a few minutes.

The preimpregnated articles prepared from fibrous materials and the compositions according to the present invention can be used directly after drying or can be stored with a view to being used subsequently; they retain their properties in a remarkable manner when stored at ambient temperature (20°-30° C.) or below.

The prepolymer can then be cured on its support by heating to temperatures of the order of 350° C., generally from 100° to 280° C. The preimpregnated articles can be shaped beforehand or during the curing process, optionally above or below atmospheric pressure, it also being possible for these operations to be consecutive. Amongst possible uses, there may be mentioned filament winding and the production of laminates in the form of sheets or in complex shapes. The composite articles thus obtained are particularly valuable in the fields of industry requiring materials which possess good mechanical and electrical properties as well as great chemical inertness at temperatures from 220° to 300° C. By way of example, they are very suitable for the manufacture of plate or tubular insulators for dry transformers, transformer supports and motor slots, printed circuits, panels with a honeycomb structure and compressor blades.

The concentration of the suspensions according to the invention can vary within wide limits depending on the method of processing chosen. The solids content of the suspensions is usually from 5 to 60% by weight. The viscosity, which depends on the solids content and on the amount of heteropolysaccharide, can also vary within wide limits. Viscosities of from 5 cPo to 5,000 cPo are usually convenient. The suspensions are very stable when stored and if sedimentation takes place the sediment can easily be redispersed. In the case of low solids contents, it is possible to measure the rate of sedimentation by placing approximately 100 $cm^3$ of the suspension in graduated tubes of diameter 25 mm. and height 25 cm. The variation with time of the height over which the suspension is homogeneous is then recorded.

These dispersions can be processed easily, particularly because of their pseudoplastic rheological properties.

The rheological properties of the suspensions can be measured by means of an eight speed Brookfield RTV viscometer. The suspension sample is placed in a bath thermostatically controlled at 23° C. The viscosity in centipoises is measured for each speed after stirring for 30 seconds at this speed.

The pseudoplasticity of the suspension can be measured for low and average stresses using a torsion viscometer of the Rheomat type equipped with systems (tank and moving part) A or B, at 23° C.

The use of a heteropolysaccharide, even in very low amounts, makes it possible to increase the viscosity of very dilute suspensions. Furthermore, it has been found that the use of a heteropolysaccharide makes it possible to lower the viscosity of suspensions possessing solids contents which are generally above 40%, for instance. Thus the addition of 0.05% by weight, relative to the prepolymer powder, to a suspension with a solids content of 45% causes the viscosity, measured using a Rheomat 30 apparatus equipped with a moving part A, to fall from 23 poises to 4 poises.

It is thus possible to have available either suspensions which have a low viscosity and a solids content of the order of 40%, or suspensions which are more viscous but have a solids content ranging up to 60%; it is not possible to achieve this without the use of the polysaccharide.

The following Examples further illustrate the present invention.

EXAMPLE 1

Preparation of the prepolymer 820 g of 4,4'-bis-maleimido-diphenylmethane are mixed intimately with 180 g of 4,4'-diaminodiphenylmethane, using a turbine mixer. The powder obtained is spread on a metal plate to a thickness of approximately 1 cm. The plate is then placed in an oven at 165° C for 30 minutes.

After cooling, a prepolymer which softens at 100° C is obtained. This prepolymer is ground, the diameter of the granules obtained being less than 40 $\mu$; 98% of them having a size between 15 and 40 $\mu$.

Preparation of the composition 500 cm$^3$ of water are placed in a 1,000 cm$^3$ beaker. 0.21 g of a heteropolysaccharide which has a molecular weight of several millions and which was prepared by fermentation of carbohydrates by means of the bacterium of the *Xanthomonas Campestris* type, is added whilst agitating.

214 g of the prepolymer prepared above are then added, over the course of 15 minutes, still with agitation. Agitation is continued for a further 30 minutes. The viscosity is measured using a Brookfield RTV apparatus equipped with moving part 2. As a speed of 100 revolutions/minute, the viscosity is 30 cPo.

The rheological curve is then measured on a torsion viscometer of the Rheomat 15 type.

For a stress (rate of shear) of 100 sec.$^{-1}$, the viscosity is 5 cPo.

Impregnation of a woven glass fabric

A strip of woven glass fabric of the satin type, having a specific gravity of 308 g/m$^2$, is impregnated continuously with the composition prepared in the manner just described; this woven fabric has been desized beforehand under the action of heat and has then been treated with $\gamma$-amino-propyltriethoxysilane.

The woven fabric passes vertically through an impregnation tank containing the composition described above. The height of the composition in this tank is 30 cm. Two knives situated on either side of the strip, with a 0.5 mm space between them, are placed at the outlet. The coated woven fabric then passes through a vertical oven of height 3 m, heated to 150° C and ventilated at the rate of 2,000 m$^3$ of air per hour.

At the outlet of the oven, the strip is wound up on a drum at the rate of 50 m/hour.

The woven fabric thus preimpregnated contains 30% by weight of prepolymer relative to the total weight of prepolymer plus woven fabric.

Preparation of a laminate 18 square samples (30 cm $\times$ 30 cm) are cut out of the impregnated woven fabric and are stacked, alternately crossing weft and warp. The combination is then placed between the platens of a press which are preheated to 100° C and to which a pressure of 60 bars is applied. The temperature is then raised to 180° C over the course of 30 minutes and the whole is kept at this temperature for 1 hour. The laminate is cooled under pressure to 100° C and is then freed and subjected to a supplementary heat treatment at 250° C for 24 hours. At the end of this treatment, it possesses a flexural breaking strength of 55.6 kg/mm$^2$.

EXAMPLE 2

The composition is prepared as in Example 1, but the following products are used:
500 cm$^3$ of water,
88.2 g of N-methylpyrrolidone,
0.1 g of heteropolysaccharide and
481 g of the prepolymer prepared in Example 1.

The water and the heteropolysaccharide are mixed first. The N-methylpyrrolidone followed by the prepolymer are then added, with stirring.

A pseudoplastic fluid suspension which has a solids content of 45% and which does not undergo sedimentation is obtained.

The rheological curve is measured on a torsion viscometer of the Rheomat 30 type equipped with a system comprising tank and moving part B.

The curve I in the FIGURE in the accompanying drawing in which the apparent viscosity expressed in poises is plotted as the ordinate and the apparent rate of shear R is plotted as the abscissa, is obtained. The gradient is expressed in sec$^{-1}$.

It can be seen that the composition is pseudoplastic.

EXAMPLE 3

Example 2 is repeated, but 0.96 g of heteropolysaccharide instead of 0.1 g, corresponding to 0.2% relative to the prepolymer instead of 0.02% in Example 2, is used.

The rheological curve II in FIG. 1 is obtained.

The composition, which is more fluid, is pseudoplastic but does not undergo sedimentation.

EXAMPLE 4

In order to measure the rate of sedimentation, a suspension with a 5% solids content is prepared. 0.5 g of heteropolysaccharide (corresponding to 1% relative to the prepolymer) is dispersed in 807.5 g of water. 142.5 g of N-methylpyrrolidone are then added, with stirring. 50 g of the prepolymer prepared in Example 1 are added, with stirring over the course of a few minutes. Stirring is continued for 15 minutes.

Approximately 100 cm$^3$ of the suspension are poured immediately into graduated glass tubes. The sedimentation of the suspension is followed as a function of time: the height over which the suspension is homogeneous is noted as a percentage of the total height.

A control sample without any heteropolysaccharide was prepared and tested under the same conditions.

The results are given in the following table:

| Duration of the test | 0 | 15 mins. | 30 mins. | 1 hr. | 3 hrs. | 6 hrs. | 12 hrs. | 24 hrs. |
|---|---|---|---|---|---|---|---|---|
| Residual height in % | | | | | | | | |
| of the control | 100 | 52 | 33 | 28 | 27 | 27 | 27 | 26 |
| of the composition | 100 | 98 | 94 | 93 | 78 | 53 | 40 | 35 |

The addition of 1% of heteropolysaccharide slows down considerably the sedimentation of the dispersion with a low solids content. It can further be stated that, with a 4% heteropolysaccharide content, the residual height of the suspension is above 90% after two weeks.

I claim:

1. A pseudoplastic aqueous suspension of a prepolymer powder prepared from:
   A. A imide group-containing compound chosen from the group consisting of:
      a. a bis-imide of the formula:

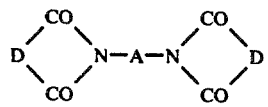

(I)

in which D represents a divalent radical which has the formula:

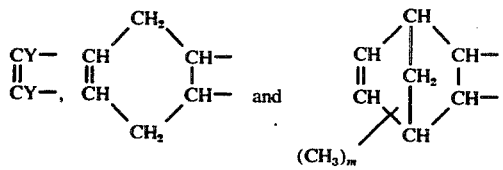

wherein Y represents H, CH₃ or Cl and $m$ is equal to 0 or 1, and A represents a divalent organic radical containing 2 to 30 carbon atoms, and b. a mixture of a bis-imide of formula (I) and a monoimide of the formula:

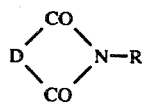

(II)

in which D is as defined above and R represents a hydrogen atom or a monovalent organic radical containing 1 to 20 carbon atoms, and B. an amino compound chosen from the group consisting of:
  a. one or more polyamines containing 2 to 5 primary or secondary amino groups, at least one of these groups being primary,
  b. a mixture comprising one or more polyamines as defined under a) and one or more primary and/or secondary mono-amines and/or one or more secondary polyamines, and
  c. a polyamine of the general formula:

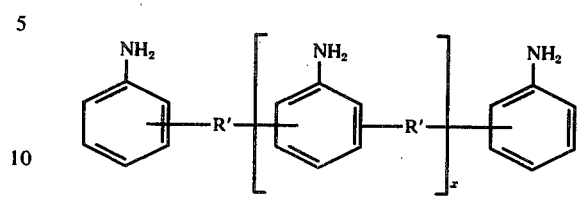

in which $x$ represents a number from 0.1 to 2 and R' represents a divalent hydrocarbon radical with 1 to 8 carbon atoms, the suspension also comprising, based on the weight of the powder, 0.01 to 8% by weight of a heteropolysaccharide of very high molecular weight.

2. A suspension according to claim 1 in which the heteropolysaccharide is one produced by fermentation of a carbohydrate by bacteria of the Xanthomonas or Arthrobacter genus or yeasts of the Cryptococcus genus.

3. A suspension according to claim 1, which also comprises a polar organic solvent which is miscible with water, has a boiling point from 110° to 270° C, in an amount up to 15% by weight of the liquid phase.

4. A suspension according to claim 3, in which the organic solvent is N-methylpyrrolidone.

5. A suspension according to claim 1 in which the prepolymer represents, by weight, 5 to 60% of the weight of the composition.

6. A suspension according to claim 1, in which the prepolymer is a product of the reaction of N,N'-4,4'-diphenylmethane-bis-maleimide and 4,4'-diaminodiphenylmethane.

7. Process for the preparation of a suspension as defined in claim 1 which comprises dispersing the prepolymer in the liquid phase containing the heteropolysaccharide, dissolved therein, by agitation.

* * * * *